(12) United States Patent
Kim et al.

(10) Patent No.: US 8,151,356 B2
(45) Date of Patent: Apr. 3, 2012

(54) METHOD OF TRANSMITTING AND REPRODUCING CONTENT PROCESSED BY VARIOUS DRM SYSTEMS

(75) Inventors: Chi-hurn Kim, Hwaseong-shi (KR);
Yang-lim Choi, Seongnam-si (KR);
Young-sun Yoon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1586 days.

(21) Appl. No.: 11/191,137

(22) Filed: Jul. 28, 2005

(65) Prior Publication Data

US 2006/0026691 A1    Feb. 2, 2006

Related U.S. Application Data

(60) Provisional application No. 60/591,878, filed on Jul. 29, 2004.

(30) Foreign Application Priority Data

Sep. 6, 2004 (KR) .................. 10-2004-0070795

(51) Int. Cl.
*G06F 1/00* (2006.01)
(52) U.S. Cl. ............... 726/26; 726/10; 726/27; 726/31; 713/175; 380/44; 709/229; 705/59
(58) Field of Classification Search ............ 726/10, 726/6, 26
See application file for complete search history.

(56) References Cited

U.S. PATENT DOCUMENTS

| | | | |
|---|---|---|---|
| 6,928,545 B1 * | 8/2005 | Litai et al. .................. | 713/185 |
| 7,185,363 B1 * | 2/2007 | Narin et al. .................. | 726/6 |
| 7,395,245 B2 * | 7/2008 | Okamoto et al. ............. | 705/59 |
| 7,464,273 B2 * | 12/2008 | Kugai .......................... | 713/189 |
| 7,657,742 B2 * | 2/2010 | Yamada ....................... | 713/168 |
| 7,681,035 B1 * | 3/2010 | Ayars et al. .................. | 713/165 |

(Continued)

FOREIGN PATENT DOCUMENTS

EP    1 376 309 A2    1/2004

(Continued)

OTHER PUBLICATIONS

Mulligan et al., How DRM-based content delivery systems disrupt expectations of "personal use", Oct. 27, 2003, ACM Workshop on Digital Rights Management, Washington, DC, USA, pp. 77-89.*

(Continued)

*Primary Examiner* — Taghi Arani
*Assistant Examiner* — Morshed Mehedi
(74) *Attorney, Agent, or Firm* — Sughrue Mion, PLLC

(57) ABSTRACT

Provided is a method of transmitting content processed according to first digital rights management (DRM) to a device that uses second DRM. The method includes generating a ticket using a first license server and a second license server, the first license server issuing a first license for use in the first DRM and the second license server issuing a second license for use in the second DRM; the second device obtaining a second content key required to process the content using the ticket and the second DRM; and the second device receiving the content from the first device and processing the content using the second content key and the second DRM. The ticket includes use control information that specifies a restriction of use of the content, and the second content key required to process the content using the second DRM.

19 Claims, 6 Drawing Sheets

U.S. PATENT DOCUMENTS

| | | | |
|---|---|---|---|
| 2003/0005135 A1* | 1/2003 | Inoue et al. | 709/229 |
| 2003/0048907 A1* | 3/2003 | Nakahara et al. | 380/277 |
| 2003/0126086 A1* | 7/2003 | Safadi | 705/51 |
| 2003/0187801 A1 | 10/2003 | Chase, Jr. et al. | |
| 2003/0194092 A1 | 10/2003 | Parks et al. | |
| 2004/0158712 A1* | 8/2004 | Lee et al. | 713/165 |
| 2004/0162846 A1* | 8/2004 | Nakahara et al. | 707/102 |
| 2004/0172561 A1* | 9/2004 | Iga | 713/201 |
| 2004/0249768 A1* | 12/2004 | Kontio et al. | 705/65 |
| 2004/0253942 A1* | 12/2004 | Mowry et al. | 455/410 |
| 2005/0021556 A1* | 1/2005 | Noguchi et al. | 707/102 |
| 2005/0021995 A1* | 1/2005 | Lal et al. | 713/200 |
| 2005/0044391 A1* | 2/2005 | Noguchi et al. | 713/193 |
| 2005/0074121 A1* | 4/2005 | Miura | 380/255 |
| 2005/0076096 A1* | 4/2005 | Nishibe et al. | 709/218 |
| 2005/0080746 A1* | 4/2005 | Zhu et al. | 705/59 |
| 2005/0084109 A1* | 4/2005 | Durand | 380/259 |
| 2005/0088687 A1* | 4/2005 | Atobe | 358/1.15 |
| 2005/0149340 A1* | 7/2005 | Murakami et al. | 705/1 |
| 2005/0278259 A1* | 12/2005 | Gunaseelan et al. | 705/59 |
| 2007/0027814 A1* | 2/2007 | Tuoriniemi | 705/59 |

FOREIGN PATENT DOCUMENTS

| | | |
|---|---|---|
| JP | 2000-298689 A | 10/2000 |
| JP | 2002-149848 A | 5/2002 |
| KR | 10-2002-0018011 A | 3/2002 |
| KR | 10-2002-0019806 A | 3/2002 |
| KR | 10-2002-0019807 A | 3/2002 |
| KR | 10-2003-0026706 A | 4/2003 |
| KR | 10-2004-0013726 A | 2/2004 |
| WO | WO 03/034313 A2 | 4/2003 |
| WO | WO 2004/019191 A2 | 3/2004 |
| WO | WO 2004102459 A1 * | 11/2004 |

OTHER PUBLICATIONS

Pestoni et al., "peer-to-peer content protection", Signal Processing Magazine, IEEE, Mar. 2004, vol. 21, Issue: 2, p. 71-81.*

* cited by examiner

METHOD OF TRANSMITTING AND REPRODUCING CONTENT PROCESSED BY VARIOUS DRM SYSTEMS

This application claims the priorities of U.S. Provisional Application No. 60/591,878, filed on Jul. 29, 2004 in the USPTO, and Korean Patent Application No. 10-2004-0070795, filed on Sep. 6, 2004 in the Korean Intellectual Property Office, the disclosures of which are incorporated herein in their entirety by reference.

BACKGROUND OF THE INVENTION

1. Field of the Invention

The present invention relates to changing of digital rights management (DRM), and more particularly, to a method of transmitting content processed by a DRM directly to a device that uses another DRM, and a method of reproducing the content.

2. Description of the Related Art

Digital rights management (DRM) indicates a method of managing digital contents so that only an authorized user can use them. In general, a DRM system includes a content server that provides content; a license server that gives a user a right to use the content, changes the right, or removes the right from the user; and a user device that receives the content from the content server, receives the right for the content from a license server, and uses the content.

A DRM server application program is installed in the license server, and a DRM client application program is installed in the user device. Various DRM programs have been developed and used, such as SmartRight developed by Thomson, Open Conditional Content Access Management (OCCAM) suggested by Sisco, an xCP Cluster Protocol developed by IBM, and Digital Transmission Content Protection (DTCP) developed by Digital Transmission License Administrator (DTLA).

FIG. 1 is a schematic block diagram of a conventional DRM system. Referring to FIG. 1, a device 1 sends a content server 2 a message 4 requesting content that a user desires to receive.

The content server 2 transmits content 5 processed according to DRM A to the device 1. That the content 5 is processed according to the DRM A is understood that the content 5 is encrypted using an encryption key and an encryption format defined in the DRM A, and that use control information regarding the content 5, which specifies usage rules and a number of times and a period of time that the content 5 can be reproduced, for example, is recorded in a format defined by the DRM A.

Next, the device 1 sends the license server 3 a message 6 requesting a license for the content 5. A license is a legal document giving official permission to use predetermined content. The license includes a decryption key for decrypting the content and the use control information. If the content is processed according to the DRM A, the device 1 must acquire a license for the content defined in the DRM A, in order to use the content.

The license server 3 determines whether the user is an authorized user, and generates a license 7 for the content 5 and transmits the license 7 to the device 1 when the user is an authorized user. The license 7 includes a decryption key and use control information specified by the DRM A.

Referring to FIG. 1, the license server 3 may be combined with the content server 2 to form a DRM server 8.

The device 1 reproduces the content 5 using the license 7. Specifically, a DRM client program installed in the device 1 extracts the decryption key for decrypting the content 5 and the use control information from the license 7, and checks a number of times and a period of time that the content 5 can be reproduced, which is described in the extracted use control information, to determine whether use of the content 5 violates rules defined in the use control information. If the use of the content 5 does not violate the rules, the content 5 is decrypted using the decryption key and the decrypted content is reproduced.

Since the data format of a license varies according to the type of a DRM system used, a DRM system must be changed to allow data to be exchanged between devices that use different DRM systems.

FIG. 2 is a diagram illustrating a conventional method of changing DRMs. Conversion of DRM A into DRM B allows a device Dev_B that uses the DRM B to receive and reproduce content Cont_A processed according to the DRM A.

In FIG. 2, a device Dev_A, which is currently being used, uses the DRM A, and the device Dev_B uses the DRM B. The content Cont_A is obtained by processing content Cont using the DRM A, and stored in the device Dev_A. The method shown in FIG. 2 will now be described in detail for a case where the device Dev_B desires to use the content Cont using the DRM B and the device Dev_A provides the content Cont to the device Dev_B. Throughout this disclosure, content Cont_A indicates content obtained by processing the content Cont according to the DRM A, and content Cont_B indicates contents obtained by processing the content Cont according to the DRM B.

Referring to FIG. 2, the device Dev_A sends a DRM conversion server S-conv a message indicating that the device Dev_B has used the DRM B and requires the content, together with the content Cont_A and a license Lic_A (S202).

Next, the DRM conversion server S_conv converts the content Cont_A into the content Cont_B using a server S_A (S204 and S206).

Next, the DRM conversion server S-conv requests and receives a license Lic_B required to use the content Cont_B from a server S_B corresponding to the DRM B (S208 and S210).

Thereafter, the DRM conversion server S_conv transmits the content Cont_B and the license Lic_B to the device Dev_B (S212). In this case, the content Cont_B and the license Lic_B may be transmitted to the device Dev_B via the device Dev_A or transmitted directly to the device Dev_B.

However, in the conventional method, the content Cont_A is transmitted from the device Dev_A to the DRM conversion server S_conv and the content Cont_B is transmitted from the DRM conversion server S_conv to the device Dev_B, thereby increasing load on a transmission line and the processing load on the DRM conversion server S_conv. In general, since a DRM conversion server is connected to lots of devices, this problem becomes worse.

SUMMARY OF THE INVENTION

The present invention provides a method of transmitting content processed using one DRM directly to a device that uses another DRM, thereby minimizing a load on a DRM conversion server and a transmission channel.

The present invention also provides a method of reproducing content processed using one DRM in a device that uses another DRM.

According to one aspect of the present invention, there is provided a method of transmitting first content, which is obtained by processing content using first digital rights management (DRM), from a first device that uses the first DRM to a second device that uses second DRM, the method including (a) generating a ticket using a first license server and a second license server, the first license server issuing a first license for use in the first DRM and the second license server issuing a second license for use in the second DRM; (b) the second device obtaining a second content key required to process the content using the ticket and the second DRM; and (c) the second device receiving the content from the first device and processing the content using the second content key and the second DRM. The ticket comprises use control information which specifies a restriction of use of the content, and the second content key required to process the content using the second DRM.

Operation (a) may comprise: (a1) receiving the first license from the first device; (a2) receiving the use control information from the first license server, the use control information generated by the first license server and extracted from the first license; (a3) receiving the second content key, which is generated by the second license server, from the second license server; and (a4) generating the ticket using the use control information and the second content key.

Operation (a1) may comprise (a11) receiving destination information regarding the destination of the content from the first device.

Operation (a1) may further comprise (a12) receiving from the first device a conversion list which lists DRM that are convertible to or from the first DRM, wherein (a2) through (a4) are performed only when the second DRM is included in the conversion list.

Operation (a2) may comprise: (a21) a DRM conversion server transmitting the first license to the first license server; and (a22) the first license server extracting the use control information from the first license and transmitting the extracted use control information to the DRM conversion server.

Operation (b) may comprise: (b1) the second device receiving the ticket from the DRM conversion server; and (b2) the second device extracting the second content key from the ticket.

Operation (c) may comprise: (c1) the second device receiving the content from the first device; and (c2) the second device encrypting the content using the second content key immediately after the second device receives the content.

According to another aspect of the present invention, there is provided a method of reproducing second content processed using a second device according to second digital rights management (DRM). The second content is generated from first content obtained by processing content according to first DRM using a first device. The second content is reproduced using a second license required to reproduce the second content, a ticket generated using use control information and a second content key, the use control information specifying a restriction of use of the content, and the second content key used to process the content in the second DRM. The ticket is generated by a DRM conversion server using a first license server and a second license server, the first license server issuing a first license and the second license server issuing a second license.

The method includes (a1) the second device transmitting the ticket to the DRM conversion server; (a2) the DRM conversion server extracting the use control information and the second content key from the ticket and transmitting them to the second license server; (a3) the second license server generating the second license using the use control information and the second content key and transmitting it to the second device; and (a4) the second device reproducing the second content using the second license.

According to yet another aspect of the present invention, there is provided a digital rights management (DRM) conversion system for converting first content, which is obtained by processing content according to first DRM, into second content obtained by processing the content according to second DRM, the DRM system comprising: a first device which includes a first license required to reproduce the first content, and transmits the content to a second device which uses the second DRM; a DRM conversion server which generates a ticket using the first license; and the second device which converts the content into the second content using the ticket and reproduces the second content. The ticket contains use control information which specifies a restriction of use of the content, and a second content key required to process the content according to the second DRM.

The DRM conversion server transmits the first license to the first license server; receives the use control information from the first license server; receives the second content key, which is generated by the second license server, from the second license server; and generates the ticket using the use control information and the second content key.

According to still another aspect of the present invention, there is provided a digital rights management (DRM) conversion system for converting first content, which is obtained by processing content according to first DRM, into second content obtained by processing the content according to second DRM. A ticket is generated according to a first license required to reproduce the first content, and transmitted to a second device which uses the second DRM. The ticket is received from the second device, and a second license is obtained from the ticket and transmitted to the second device, and the ticket includes use control information specifying a restriction of use of the content, and a second content key required to process the content using the second DRM.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
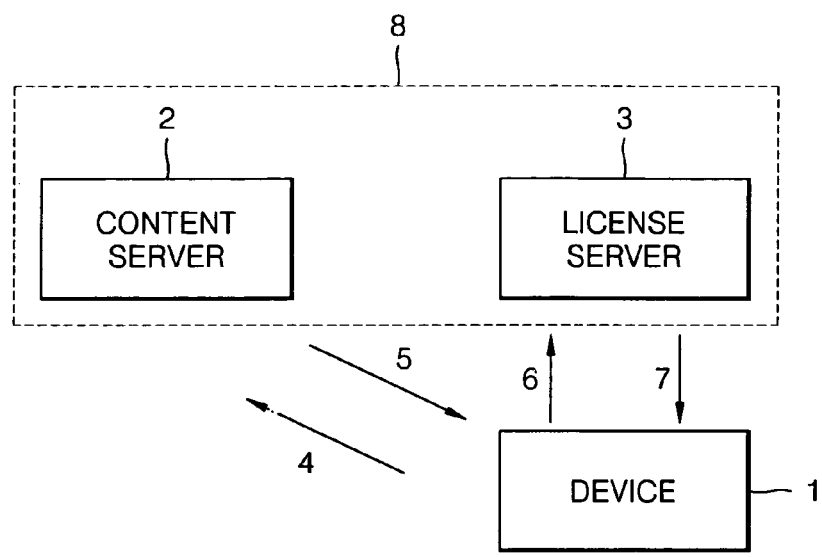
FIG. 1 is a schematic block diagram of a conventional digital rights management (DRM) system.

Hereinafter, exemplary embodiments of the present invention will be described in detail with reference to the accompanying drawings. The same reference numerals represent the same elements throughout the drawings.

For better understanding of the present invention, terms used in this disclosure will now be explained. First content is obtained by processing predetermined content using first digital rights management (DRM). In other words, the first content is obtained by encrypting the predetermined content using a first content key. Similarly, second content is obtained by processing the predetermined content using second DRM.

A first license indicates a license for using content encrypted using the first DRM. That is, the first content can be reproduced using the first license. The first license includes use control information and a content key to be used in the first DRM system. The use control information and the content key may be encrypted. The use control information specifies a period of time when and a number of times that the first content can be reproduced. The use control information is shared by all DRM systems. Thus, the use control information extracted from the first license is also applicable to a second license. Likewise, the second license indicates a license for using content encrypted using a second DRM.

A first license server issues the first license, and a second license server issues the second license.

The first content key denotes an encryption key or a decryption key used in the first DRM system. The encryption key and the decryption key may be the same in a symmetrical key structure and be different from each other in an asymmetrical key structure. In the first DRM system, the first content is encrypted or decrypted using the first content key. Since a content key generated by a manufacturer is not public to another manufacturer, the first content key extracted from the first license cannot be used in the second DRM system. Similarly, a second content key is used in only the second DRM system.

Figure 3:
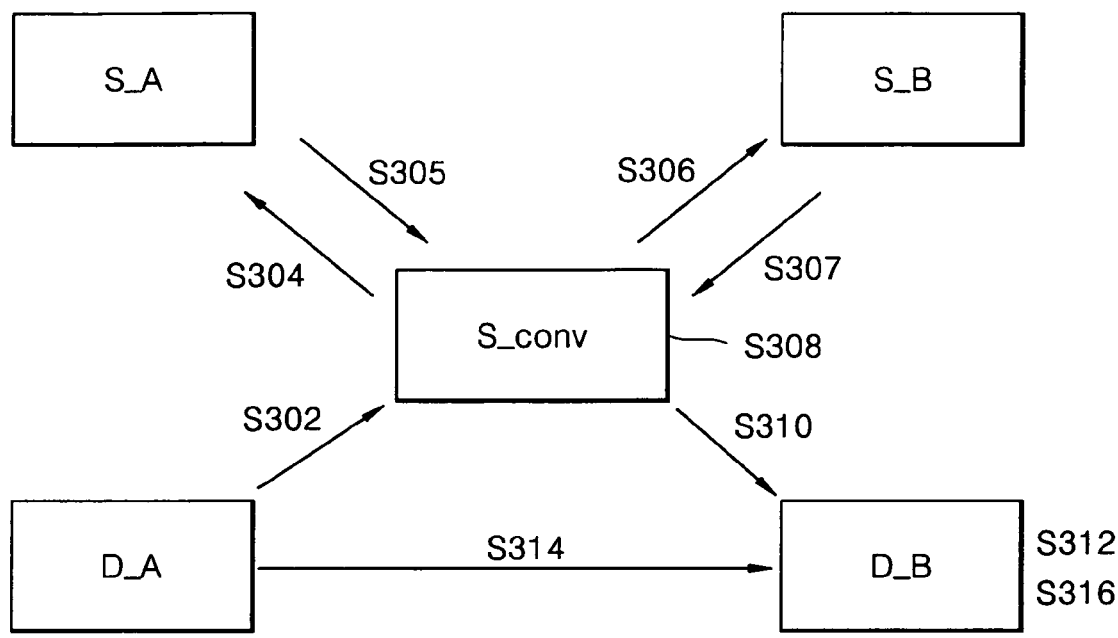
FIG. 3 is a block diagram illustrating a method of transmitting content according to an exemplary embodiment of the present invention.

FIG. 3 is a block diagram illustrating a method of transmitting content according to an embodiment of the present invention. In the method illustrated in FIG. 3, a device D_A sends a DRM conversion server S_conv a license Lic_A and destination information indicating that the destination of content Cont is a device D_B (S302). The device D_A uses DRM A, and a device D_B uses DRM B. Content Cont_A is obtained by processing the content Cont using the DRM A. The license Lic_A denotes a license required to reproduce the content Cont_A.

Next, the DRM conversion server S-conv acquires use control information I_usage from a license server S_A (S304 and 305), and acquires a content key from a license server S_B (S306 and 307).

More specifically, the DRM conversion server S_conv transmits the license Lic_A to the license server S_A (S304). The license server S_A uses the DRM A.

Next, the license server S_A extracts the use control information I_usage from the license Lic_A, and transmits it to the DRM conversion server S_conv (S305). The use control information I_usage specifies a period of time when and a number of times that the content Cont can be reproduced.

Next, the DRM conversion server S_conv sends the license server S_B a message that requests a content key for the content Cont (S306). The license server S_B uses the DRM B.

Next, the license server S_B generates a content key K_B for the content Cont that can be used in the DRM B, and transmits the content key K_B to the DRM conversion server S_conv (S307).

Next, the DRM conversion server S_conv generates a ticket Tic using the use control information I_usage and the content key K_B (S308). If the ticket Tic contains the use control information I_usage and the content key K_B, the data format of the ticket Tic is not limited. Alternatively, the ticket Tic may be encrypted and the result of encryption may be transmitted.

Next, the DRM conversion server S_conv transmits the ticket Tic to the device D_B (S310).

Next, the device D_B extracts the use control information I_usage and the content key K_B from the ticket Tic (S312).

Next, the device D_A transmits the content Cont to the device D_B (S314). Alternatively, the content Cont may be encrypted and the result of encryption may be transmitted to the device D_B via a transmission line.

Next, the device D_B generates encrypted content Cont_enc by encrypting the content Cont using the content key K_B extracted in operation S312, and stores the encrypted content Cont_enc in an information storage medium (not shown) included in the device D_B (S316).

The encrypted content Cont_enc is encrypted using the content key K_B, and the content key K_B is generated using the DRM B. That is, the encrypted content Cont_enc is content Cont_B processed using the DRM B. Accordingly, the content Cont_B is stored in the device D_B, and the device D_B can use the content Cont_B within a restricted range specified by the use control information I_usage.

The device D_B must be designed to allow the content Cont to be encrypted right after the content Cont is received from the device D_A so that the device D_B can use the content Cont according to only the DRM B. If the content Cont received from the device D_A is not encrypted, the device D_B can use the content Cont without the DRM B. In this case, it is impossible to achieve the object of the DRM that only an authorized user is allowed to use the content Cont, which is not preferable in view of business rules.

Figure 4:
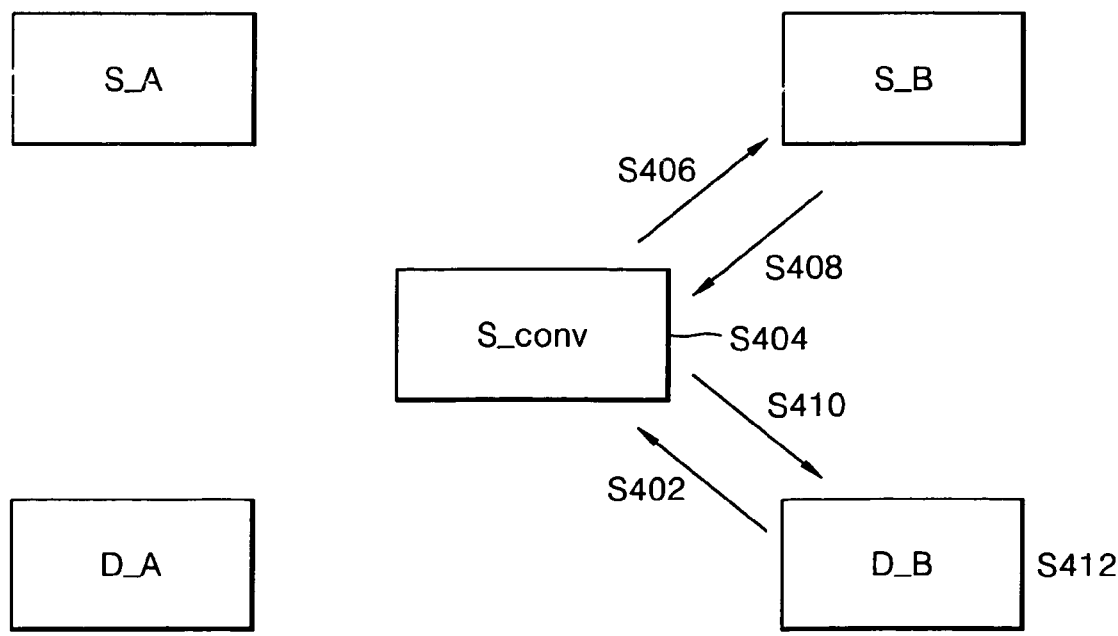
FIG. 4 is a block diagram illustrating a method of reproducing the content transmitted using the method illustrated in FIG. 3 according to an exemplary embodiment of the present invention.

FIG. 4 is a block diagram illustrating a method of reproducing the content Cont_B produced in the method illustrated in FIG. 3 according to an embodiment of the present invention. In the method illustrated in FIG. 4, the device D_B transmits the ticket Tic to the DRM conversion server S_conv (S402).

Next, the DRM conversion server S_conv extracts the use control information I-usage and the content key K_B from the ticket Tic, and transmits them to the license server S_B (S404 and 406).

Next, the license server S_B generates the license Lic_B using the use control information I-usage and the content key K_B, and transmits it to the DRM conversion server S_conv (S408).

Next, the DRM conversion server S_conv transmits the license Lic_B to the device D_B (S410).

Next, the device D_B uses the content Cont_B using the license Lic_B (S412). In other words, the device D_B extracts the use control information I_usage from the license Lic_B, and checks whether a number of times that and a period of time when the content Cont can be reproduced are consistent with the use control information I_usage. Also, based on the use control information I_usage, the device D_B extracts the content key K_B from the license Lic_B, generates the content Cont by decrypting the content Cont_B using the content key K_B, and reproduces the content Cont.

In the methods illustrated in FIGS. 3 and 4, the DRM conversion server S_conv extracts the use control information I_usage and the content keys K_B, which are specified in different DRM systems, from the licenses Lic_A and Lic_B which are not compatible with each other, respectively, and generates the tickets Tic for use in the respective DRM systems or converts the licenses Lic_A and Lic_B into the licenses Lic_B and Lic_A, respectively. That is, the DRM conversion server mediates between two devices using different DRM systems, and between different license servers. Also, the license servers S_A and S_B generate the licenses Lic_A and Lic_B using the use control information I_usage and the content key K_B, respectively, or extract the use control information I_usage and the content key K_B from the licenses Lic_A and Lic_B, respectively.

Figure 2:
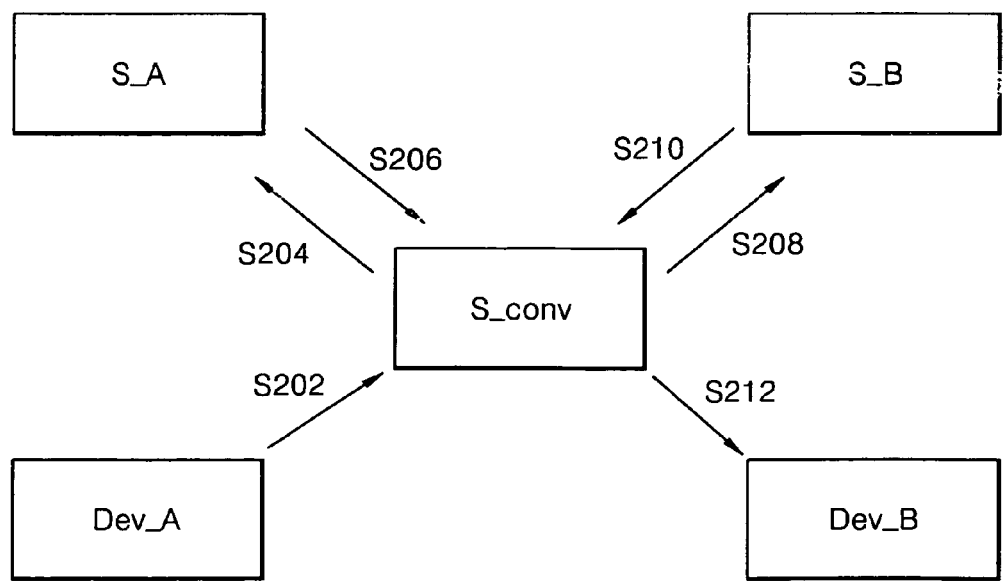
FIG. 2 is a block diagram illustrating a conventional method of changing DRMs.

The methods illustrated in FIGS. 3 and 4 are differentiated from the conventional method illustrated in FIG. 2 in that content and a license are transmitted separately. The content is transmitted between the devices D_A and D_B, not between the DRM conversion server and the devices D_A and D_B. In general, a load on a transmission channel is caused by the transmission of content rather than the transmission of a message. Thus, transmission of the content between the DRM conversion server and the devices D_A and D_B increases the load on a transmission channel. In particular, when the number of devices used is great, the higher the frequency of exchange of data between the DRM conversion server and the devices, the greater the load on the DRM conversion server. In this case, the DRM conversion server requires a large bandwidth to transmit lots of data. However, the transmission of data between devices does not affect the transmission of data between the DRM conversion server and another device, and thus, a large bandwidth DRM conversion server is not required.

Figure 5:
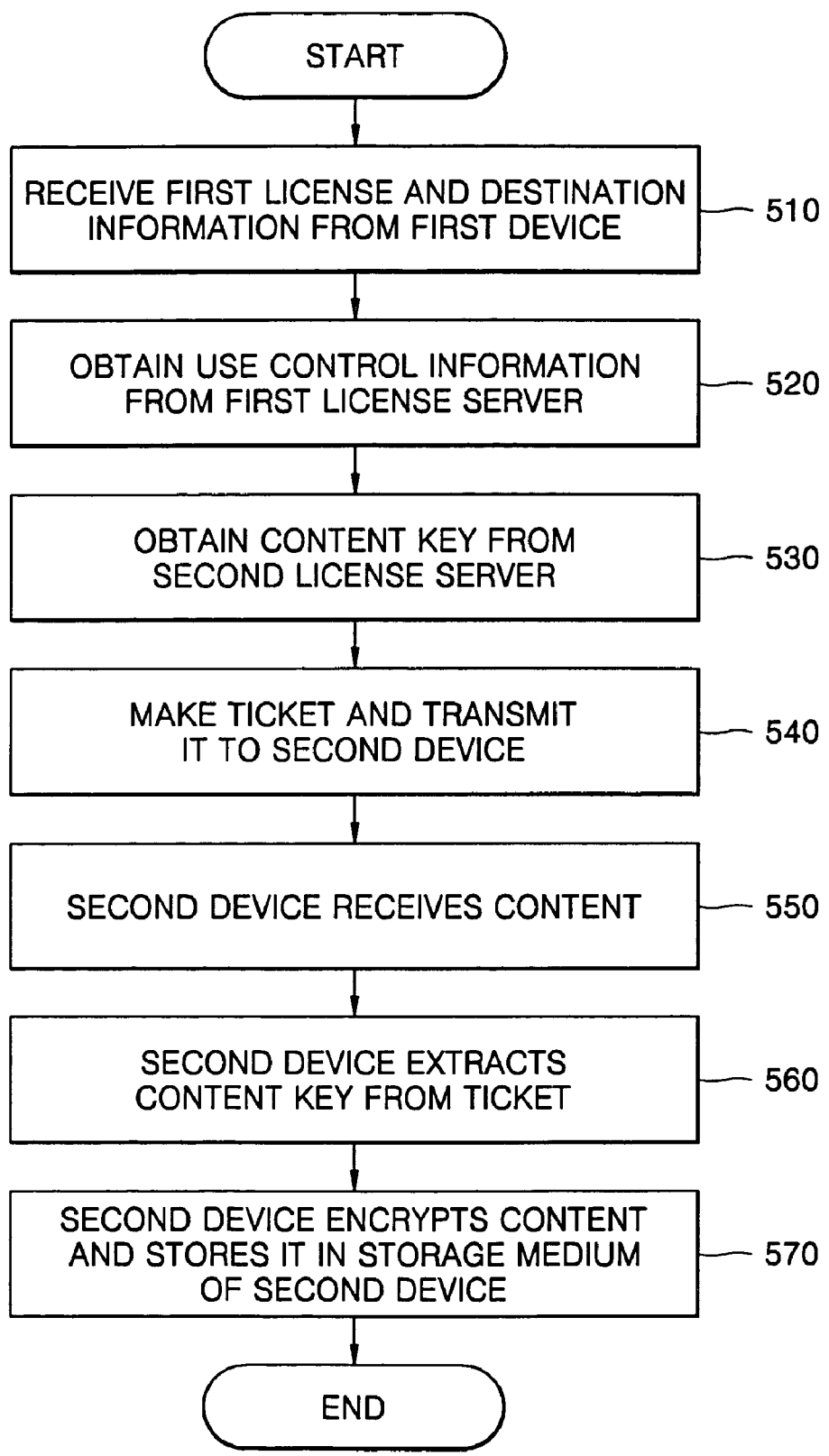
FIG. 5 is a flowchart illustrating a method of transmitting content according to an exemplary embodiment of the present invention.

FIG. 5 is a flowchart illustrating a method of transmitting content Cont according to an embodiment of the present invention. In this method, a DRM conversion server S_conv receives from a first device D_A that uses first DRM A a first license Lic_A for the content Cont_A to be managed using a first DRM system A, and destination information indicating that the destination of the content Cont is a second device D_B that uses second DRM B (operation 510).

Next, the DRM conversion server obtains use control information I_usage contained in the first license Lic_A related to the first DRM A (operation 520). That is, the DRM conversion server transmits the first license Lic_A to the license server S_A that uses the first DRM A, and the license server S_A extracts the use control information I_usage from the first license Lic_A and transmits it to the DRM conversion server.

Next, the DRM conversion obtains a content key K_B, which will be used to reproduce the content Cont server using the second DRM B, from a license server S_B using the second DRM B (operation 530). In other words, the DRM conversion server sends the license server S_B a message that requests the content key K_B so as to reproduce the content Cont. In response to the message, the license server S_B generates the content key K_B that allows the content Cont to be reproduced using the second DRM B, and transmits it to the DRM conversion server S_conv.

Next, the DRM conversion server generates a ticket Tic using the use control information I_usage and the content key K_B, and sends it to the second device D_B (operation 540).

Next, the second device D_B receives the content Cont, which is not processed using DRM, from the first device D_A (operation 550).

Next, the second device D_B extracts the content key K_B from the ticket Tic transmitted in operation 540 (operation 560).

Thereafter, the second device D_B encrypts the content Cont using the content key K_B extracted in operation 560 and stores the result of encryption in a storage medium of the second device D_B (operation 570).

Figure 6:
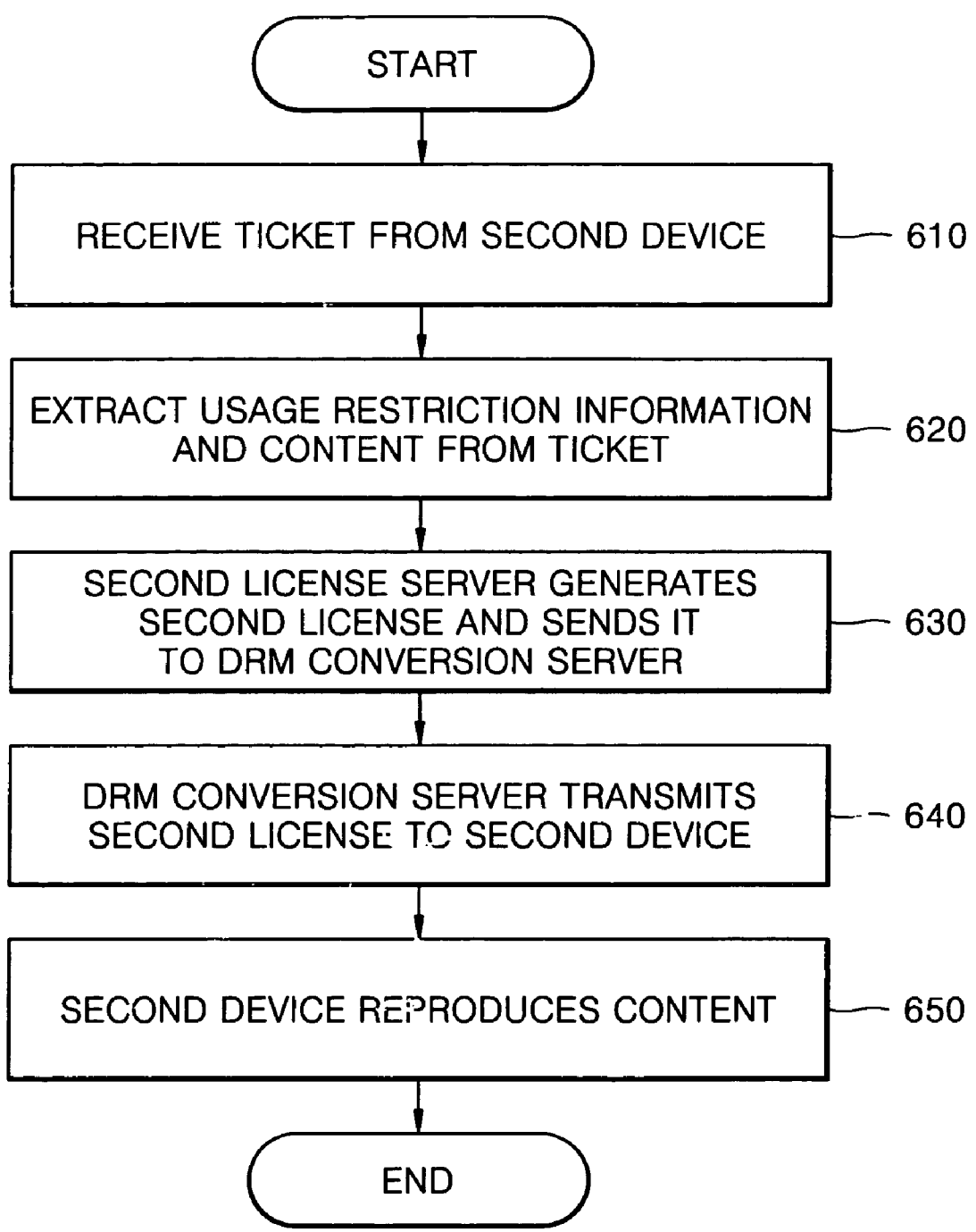
FIG. 6 is a flowchart illustrating a method of reproducing the content transmitted using the method illustrated in FIG. 5 according to an exemplary embodiment of the present invention.

FIG. 6 is a flowchart illustrating a method of reproducing content Cont stored using the method illustrated in FIG. 5, according to an embodiment of the present invention. In the present embodiment, the second device D_B obtains content Cont_B processed using second DRM B, and a ticket Tic. The ticket Tic contains use control information I_usage regarding the content Cont_B, and a content key K_B. However, although the second device D_B acquires the ticket Tic, it does not obtain a second license Lic_B for the second DRM system B. The second DRM B used by the device D_B can be used to recognize the second license Lic_B but not the ticket Tic. Thus, even if the ticket Tic contains the use control information I_usage and the content key K_B, the second device D_B cannot reproduce the content Cont_B. Therefore, the second device D_B obtains the second license Lic_B, and then reproduces the content Cont_B. The ticket Tic is used to obtain the second license Lic_B.

In the method illustrated in FIG. 6, the DRM conversion server S_conv receives the ticket Tic from the second device D_B (operation 610).

Next, the DRM conversion server S_conv generates the second license Lic_B using the second license server S_B (operations 620 and 630).

Specifically, the DRM conversion server S_conv extracts the use control information I_usage and the content key K_B from the ticket Tic, and sends them to the second license server S_B (operation 620). The second license server S_B receives the use control information I_usage and the content key K_B from the DRM conversion server S_conv, generates the second license Lic_B using the received use control information I_usage and the content key K_B, and sends the second license Lic_B to the DRM conversion server (operation 630).

Next, the DRM conversion server S_conv transmits the second license Lic_B to the second device D_B (operation 640).

Next, the second device D_B reproduces the content Cont_B using the second license Lic_B (operation 650). In other words, using the second DRM system B, the second device D_B acquires the use control information I_usage and the content key K_B by interpreting the second license Lic_B, determines whether it can reproduce the content Cont_B based on the use control information I_usage contained in the second license Lic_B, and decrypts and reproduces the content Cont_B using the content key K_B.

Figure 7:
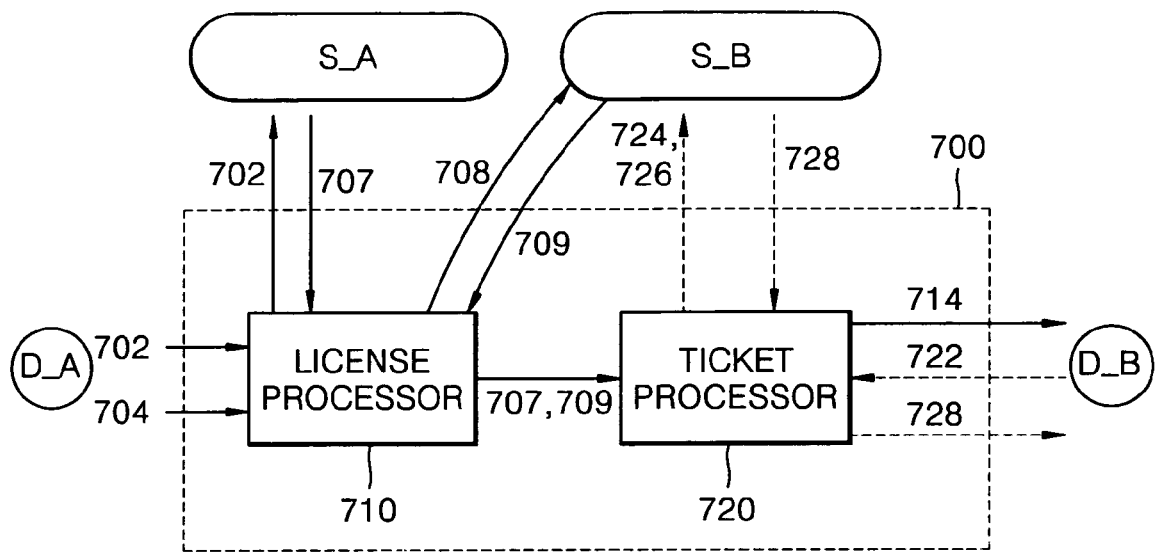
FIG. 7 is a block diagram of a DRM conversion server that performs the methods illustrated in FIGS. 5 and 6 according to an exemplary embodiment of the present invention.

FIG. 7 is a block diagram of a DRM conversion server 700 that performs the methods illustrated in FIGS. 5 and 6, according to an embodiment of the present invention. In FIG. 7, data paths indicated by solid lines are data paths through which the DRM conversion server 700 transmits content using the method illustrated in FIG. 5, and data paths indicated by dotted lines are data paths through which the DRM conversion server 700 transmits a second license to a second device D_B using the method illustrated in FIG. 6 so that the second device can reproduce the content.

The DRM conversion server 700 includes a license processor 710 that acquires information required to generate a ticket 714 while operating interactively with a first license server S_A and a second license server S_B, and a ticket processor 720 that generates the ticket 714 using a first license 702 or obtains the first license 702 from the ticket 714.

The license processor 710 receives the first license 702 and destination information 704 from a first device D_A that uses first DRM, and obtains use control information 707 and a second content key 709 from the first and second license servers S_A and S_B, respectively.

More specifically, the license processor 710 obtains the use control information 707 from the first license server S_A. That is, the license processor 710 transmits the first license 702 to the first license server S_A and receives the use control information 707 from the first license server S_A.

The first license 702 contains the use control information 707 and a first content key (not shown) regarding the content, which is to be transmitted from the first device D_A to the second device D_B. The use control information 707 and the first content key are generated using the first DRM system. In general, licenses produced in different DRM systems are generated in different formats so that only corresponding license servers can interpret the licenses. Therefore, the license processor 710 cannot extract the use control information 707 from the first license 702. Thus, the first license server S_A extracts the use control information 707 from the first license 702 and transmits it to the license processor 710. Since the content will be transmitted to only the second device D_B, the first content key is not transmitted to the license processor 710.

Next, the license processor 710 obtains the second content key 709 from the second license server S_B. The license processor 710 sends the second license server S_B specified in the destination information 704, a message 708 that requests the second content key 709, and receives the second content key 709 from the second license server S_B.

Then, the license processor 710 sends the ticket processor 720 the use control information 707 and the second content key 709 which are received from the first license 702.

The ticket processor 720 generates the ticket 714 using the use control information 707 and the second content key 709, and transmits the ticket 714 to the second device D_B. The data format of the ticket 714 is not related to that of the first license 702 but must contain the use control information 707 and the second content key 709.

In order to reproduce the content, the ticket processor 720 receives a ticket 722 from the second device D_B, extracts use control information 724 and a second content key 726 from the ticket 722, and transmits the use control information 724 and the second content key 726 to the second license server S_B. The second license server S_B generates a second license 728 using the use control information 724 and the second content key 726 and transmits it to the ticket processor 720. The ticket processor 720 transmits the second license 728 to the second device D_B again.

Figure 8:
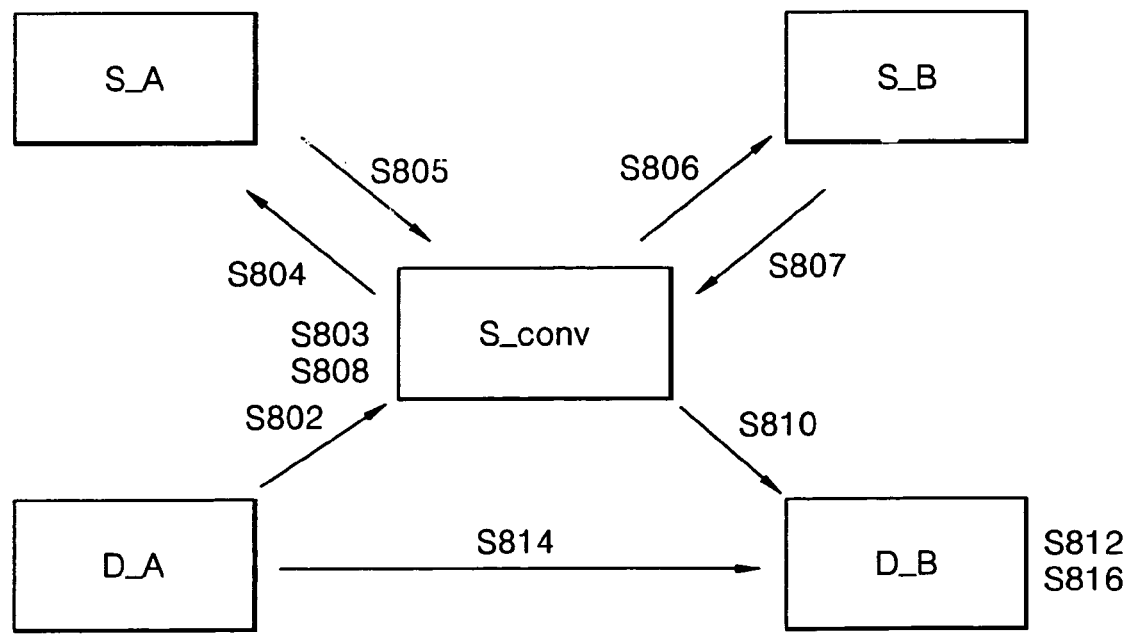
FIG. 8 is a block diagram illustrating a method of transmitting content according to another exemplary embodiment of the present invention.

FIG. 8 is a block diagram illustrating a method of transmitting content Cont according to another embodiment of the present invention. Referring to FIG. 8, a device D_A transmits, to a DRM conversion server S_conv, a license Lic_A, destination information indicating that the destination of the content Cont is the device D_B, and a conversion list List_conv listing DRM systems that are convertible to/from DRM A (operation 802). The conversion list List_conv is determined based on the right of each of devices, generated by a DRM conversion server S_conv, and provided to the devices.

Next, the DRM conversion server S_conv determines whether content processed using DRM A can be converted into content processes using desired DRM B based on the conversion list List_conv (operation 803). When the device D_A transmits the content to the device D_B, whether the content can be processed using the DRM B is determined by checking whether the DRM B is included in the conversion list List_conv produced by the device D_A. Operation 804 is performed when the content can be processed using the DRM B, and the method of FIG. 8 is completed otherwise.

Operations 804 through 816 are similar to operations 304 through 316 described with reference to FIG. 3. The DRM conversion server S_conv receives use control information I_usage from a license server S_A (operations 804 and 805), and receives a content key from a license server S_B (operations 806 and 807).

More specifically, the DRM conversion server S_conv transmits the license Lic_A to the license server S_A (operation 804). The license server S_A is related to the DRM system A.

Next, the license server S_A extracts the use control information I_usage from the license Lic_A and transmits it to the DRM conversion server S_conv (operation 805). The use control information I_usage specifies a number of times that and a period of time when the content Cont can be reproduced.

Next, the DRM conversion server S_conv sends the license server S_B a message that requests a content key K_B required to reproduce the content Cont under the DRM B (operation 806). The license server S_B is related to the DRM B.

Next, the license server S_B generates the content key K_B and transmits it to the DRM conversion server S_conv (operation 807).

Next, the DRM conversion server S_conv generates a ticket Tic using the use control information I_usage and the content key K_B (operation 808). According to the present invention, if the ticket Tic contains the use control information I_usage and the content key K_B, the data format of the ticket Tic is not limited. The ticket Tic may be encrypted and the result of encryption may be transmitted.

Next, the DRM conversion server S_conv transmits the ticket Tic to the device D_B (operation 810).

Next, the device D_B extracts the use control information I_usage and the content key K_B from the ticket Tic (operation 812).

Next, the device D_A transmits the content Cont to the device D_B (operation 814). Alternatively, the content Cont may be encrypted and transmitted to the device D_B via a transmission channel.

Thereafter, the device D_B generates encrypted content Cont_enc by encrypting the content Cont using the content key K_B extracted in operation 812, and stores it in a storage medium of the device D_B (operation 816).

Content transmitted using the method of FIG. 8 can be reproduced using the method of FIG. 6.

Figure 9:
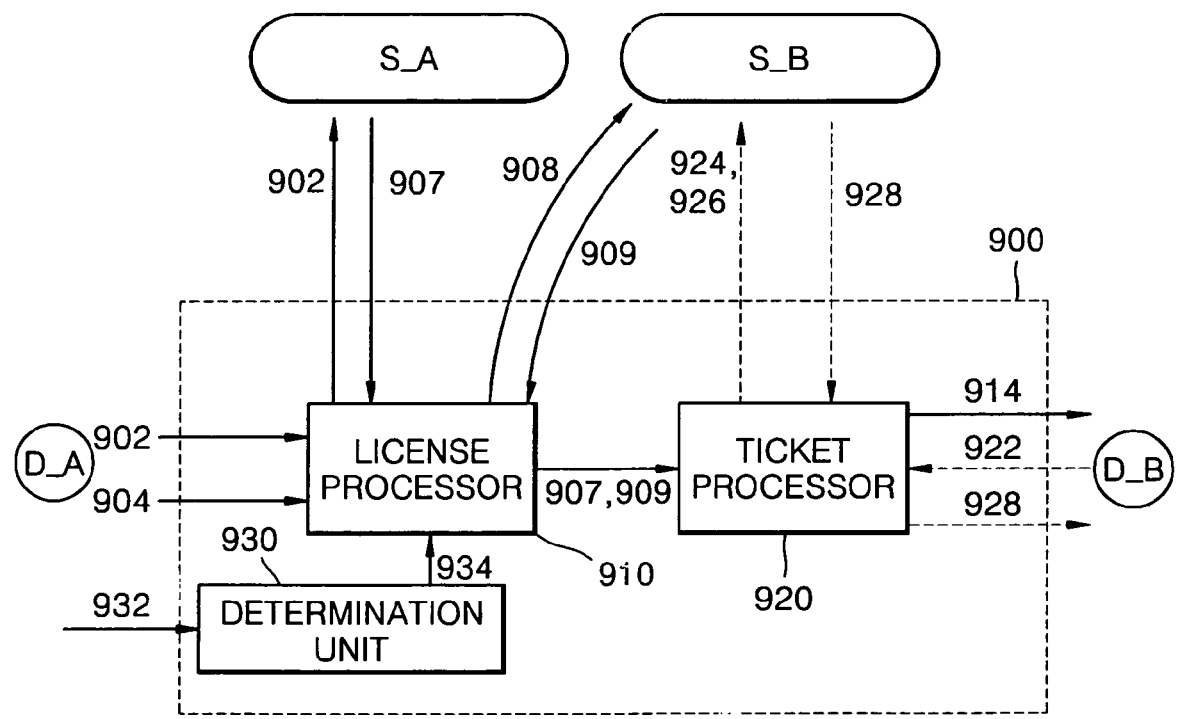
FIG. 9 is a block diagram of a DRM conversion server that performs the method illustrated in FIG. 8 according to an exemplary embodiment of the present invention.

FIG. 9 is a block diagram of a DRM conversion server 900 that performs the method of FIG. 8 according to an embodiment of the present invention. In FIG. 9, data paths indicated by solid lines are data paths through which the DRM conversion server 900 transmits content to a second device D_B using the method of FIG. 5, and data paths indicated by dotted lines are data paths through which the DRM conversion server 900 transmits a second license to the second device D_B so that the second device D_B can reproduce the content according to the method of FIG. 6.

The DRM conversion server 900 includes a license processor 910 that acquires information required to produce a ticket 914 while the DRM conversion server 900 operates interactively with a first license server S_A and a second license server S_B, and a ticket processor 920 that produces the ticket 914 using a second license 928 or obtains the second license from the ticket 914.

In the DRM conversion server 900, a determination unit 934 receives a conversion list 932 from the first device D_A, determines whether the first device D_A has a right to transmit the content to the second device D_B according to the conversion list 932, and sends the license processor 910 a message 934 that content processed using first DRM A can be converted into content processed using second DRM B.

Only when the license processor 910 receives the message 934 from the determination unit 930, the license processor 910 receives a first license 902 and destination information 904 from the first device D_A that uses the first DRM, and obtains use control information 907 and a second content key from the first and second license servers S_A and S_B. If the license processor 910 does not receive the message 934, the license processor 910 generates an error message and transmits the error message to the first device D_A.

The other operations of the license processor 910 and the operations of the ticket processor 920 are similar to the operations of the license processor 710 and the ticket processor 720 of FIG. 7.

More specifically, the license processor 910 receives the use control information 907 from the first license server S_A. That is, the license processor 910 transmits the first license 902 to the first license server S_A, and receives the use control information 907 from the first license server S_A.

Next, the license processor 910 receives a second content key 909 from the second license server S_B. The license processor 910 sends a message 908 that requests the second content key 909 to the second license server S_B which is indicated in the destination information 904, and receives the second content key 909 from the second license server S_B.

Next, the license processor 910 sends the use control information 907, which is received from the first license server S_B, and the second content key 909 to the ticket processor 920.

The ticket processor 920 generates the ticket 914 using the use control information 907 and the second content key 909, and sends it to the second device D_B. The data format of the ticket 914 is not related to the data format of the first license 902, and must contain the use control information 907 and the second content key 909.

To reproduce the content, the ticket processor 920 receives a ticket 922 from the second device D_B, extracts use control information 924 and a second content key 926 from the ticket 922, and transmits the use control information 924 and the second content key 926 to the second license server S_B. The second license server S_B produces a second license 928 using the use control information 924 and the second content key 926, and transmits it to the ticket processor 920. The ticket processor 920 transmits the second license 928 to the second device D_B again.

As described above, according to the present invention, it is possible to allow a device using one DRM to use content processed according to another DRM. Also, the present invention allows content to be directly exchanged between devices, thereby reducing the load on a DRM conversion server and a transmission channel.

The present invention can be embodied as a computer readable program. Codes and code segments of the program can be easily derived by a computer programmer. The program may be stored in a computer readable medium. When the program is read and executed by a computer, a method of transmitting content according to the present invention is performed. The computer readable medium may be any recording apparatus capable of storing data that is read by a computer system, e.g., a magnetic recording medium, an optical data storage device, and a carrier wave that transmits data via the Internet.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of transmitting first content, which is obtained by processing content using first digital rights management (DRM) system, from a first device that uses the first DRM system to a second device that uses second DRM system, the method comprising:
   (a) generating, by a DRM conversion server, a ticket using a first license server and a second license server, the first license server issuing a first license for use in the first DRM system and the second license server issuing a second license for use in the second DRM system;
   (b) the second device obtaining a second content key required to process the content using the ticket and the second DRM system; and
   (c) the second device receiving the content from the first device and processing the content using the second content key and the second DRM system,
   wherein the ticket comprises use control information which specifies a restriction of use of the content, and the second content key required to process the content using the second DRM system
   wherein the second device receives the content from the first device separately from receiving the ticket from the DRM conversion server, and
   wherein (a) comprises:
   (a1) receiving the first license from the first device;
   (a2) receiving the use control information from the first license server, the use control information generated by the first license server and extracted from the first license:
   (a3) receiving the second content key, which is generated by the second license server, from the second license server; and
   (a4) generating the ticket using the use control information and the second content key.

2. The method of claim 1, wherein (a1) comprises:
(a11) receiving destination information regarding the destination of the content from the first device.

3. The method of claim 1, wherein (a1) further comprises:
(a12) receiving from the first device a conversion list which lists DRM systems that are convertible to or from the first DRM system,
wherein (a2) through (a4) are performed only when the second DRM system is included in the conversion list.

4. The method of claim 1, wherein (a2) comprises:
(a21) the DRM conversion server transmitting the first license to the first license server; and
(a22) the first license server extracting the use control information from the first license and transmitting the extracted use control information to the DRM conversion server.

5. The method of claim 4, wherein the second device obtaining the second content key comprises:
(b1) the second device receiving the ticket from the DRM conversion server; and
(b2) the second device extracting the second content key from the ticket.

6. The method of claim 1, wherein (c) comprises:
(c1) the second device receiving the content from the first device; and
(c2) the second device encrypting the content using the second content key immediately after the second device receives the content.

7. A non-transitory computer readable medium for storing a program which executes the method of claim 1 using a computer.

8. A method of reproducing second content processed using a second device according to second digital rights management (DRM) system, wherein the second content is generated from first content obtained by processing content according to first DRM system using a first device,
wherein the second content is reproduced using a second license required to reproduce the second content, a ticket generated using use control information and a second content key, the use control information specifying a restriction of use of the content, and the second content key used to process the content in the second DRM system,
wherein the ticket is generated by a DRM conversion server using a first license server and a second license server, the first license server issuing a first license and the second license server issuing a second license, and
wherein the second device receives the content from the first device separately from receiving the ticket from the DRM conversion server, and
wherein the method comprises:
(a1) the second device transmitting the ticket to the DRM conversion server;
(a2) the DRM conversion server extracting the use control information and the second content key from the ticket and the second content key to the second license server;
(a3) the second license server generating the second license using the use control information and the second content key and transmitting the second license to the second device
(a4) the second device reproducing the second content using the second license.

9. (Currently Amendment) The method of claim 8, wherein (a3) is performed using the DRM conversion server.

10. The method of claim 8, wherein (a4) comprises:
(a41) extracting the second content key from the second license; and
(a42) decrypting the second content using the second content key.

11. The method of claim 10, wherein (a4) further comprises:
(a44) extracting the use control information from the second license; and
(a45) determining whether the second content can be reproduced based on the use control information,
wherein (a41) through (a42) are performed only when it is determined that the second content can be reproduced.

12. A digital rights management (DRM) conversion system for converting first content, which is obtained by processing content according to first DRM system, into second content obtained by processing the content according to second DRM system, the DRM conversion system comprising:
a first device which includes a first license required to reproduce the first content, and transmits the content to a second device which uses the second DRM system;
a DRM conversion server which generates a ticket using the first license; and
the second device which converts the first content into the second content using the ticket and reproduces the second content,
wherein the ticket contains use control information which specifies a restriction of use of the content, and a second content key required to process the content according to the second DRM system,
wherein the second device receives the first content from the first device separately from receiving the ticket from the DRM conversion server,
wherein DRM conversion server generates the ticket using a first license server and a second license server, the first license server issuing the first license and the second license server issuing the second license, and
wherein the DRM conversion server transmits the first license to the first license server; receives the use control information from the first license server; receives the second content key, which is generated by the second license server, from the second license server generates the ticket using the use control information and the second content key.

13. The DRM conversion system of claim 12, wherein the DRM conversion server comprises:
a license processor which obtains the use control information and the second content key while operating interactively with the first and second license servers; and
a ticket processor which generates the ticket using the use control information and the second content key.

14. The DRM conversion system of claim 12, wherein the DRM conversion server receives the ticket from the second device and obtains the second license using the ticket.

15. The DRM conversion system of claim 12, wherein the DRM conversion server extracts the use control information and the second content key from the ticket, transmits the use control information and the second content key to the second license server, which issues the second license, receives the second license from the second license server, and transmits the second license to the second device.

16. A digital rights management (DRM) conversion system for converting first content, which is obtained by processing content according to first DRM system, into second content obtained by processing the content according to second DRM system, wherein a ticket is generated according to a first license required to reproduce the first content, and transmitted to a second device which uses the second DRM system,
the ticket is received from the second device, and a second license is obtained from the ticket and transmitted to the second device
the ticket includes use control information specifying a restriction of use of the content, and a second content key required to process the content using the second DRM system,
wherein the second device receives the content, from a first device that uses the first DRM system, separately from receiving the ticket from the DRM conversion server,
wherein the system comprises:
a first license server which issues the first license for the first DRM; and
a second license server which issues the second license for the second DRM
wherein the ticket is generated using the first and second licenses, and
wherein the first license is transmitted to the first license server; use control information extracted by the first license server is received from the first license server, the second content key generated by the second license server is received from the second license server, and the ticket is generated using the use control information and the second content key.

17. The DRM conversion system of claim 16, comprising:
a license processor which obtains the use control information and the second content key while operating interactively with the first and second license servers; and
a ticket processor which generates the ticket using the use control information and the second content key.

18. The DRM conversion system of claim 17, wherein the ticket processor obtains the second license by receiving the ticket from the second device and transmitting the ticket to the second license server.

19. The DRM conversion system of claim 18, wherein the ticket processor extracts the use control information and the second content key from the ticket and transmits the use control information and the second content key to the second license server, and receives the second license from the second license server and transmits the second license to the second device.

\* \* \* \* \*